(12) United States Patent
Wei et al.

(10) Patent No.: US 7,575,821 B2
(45) Date of Patent: Aug. 18, 2009

(54) INTERCONNECT SUPPORTED FUEL CELL ASSEMBLY AND PREFORM

(75) Inventors: Chang Wei, Niskayuna, NY (US); Kenneth Walter Browall, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 329 days.

(21) Appl. No.: 10/166,909

(22) Filed: Jun. 11, 2002

(65) Prior Publication Data
US 2003/0228513 A1 Dec. 11, 2003

(51) Int. Cl.
H01M 8/00 (2006.01)
H01M 4/00 (2006.01)
B05D 5/12 (2006.01)

(52) U.S. Cl. .............................. 429/12; 427/115; 429/40
(58) Field of Classification Search ................... 429/34, 429/38, 39, 35; 427/115
See application file for complete search history.

(56) References Cited

U.S. PATENT DOCUMENTS 3,133,009 A * 5/1964 Natelson ..................... 204/642
5,942,349 A * 8/1999 Badwal et al. ................ 429/34
6,183,897 B1 * 2/2001 Hartvigsen et al. ............ 429/32
6,265,095 B1 * 7/2001 Hartvigsen et al. ............ 429/32
6,383,678 B1 * 5/2002 Kaneko et al. ................ 429/34
2002/0006539 A1   1/2002 Kubota et al.

FOREIGN PATENT DOCUMENTS

| JP | 199656480 A | 9/1997 |
| WO | WO9833221 A2 | 7/1998 |
| WO | WO02101859 | 12/2002 |
| WO | WO03001624 A2 | 1/2003 |

OTHER PUBLICATIONS

Handbook of Thin Film Deposition Processes and Techniques, 2nd ed., Krishna Seshan (ed.), Noyes Publications, 2002, pp. 304-305.*

* cited by examiner

*Primary Examiner*—Patrick Ryan
*Assistant Examiner*—Julian Mercado
(74) *Attorney, Agent, or Firm*—Patrick K. Patnode

(57) ABSTRACT

A fuel cell assembly includes at least one fuel cell including at least two electrodes and an electrolyte. An interconnect structure includes at least one flow channel initially defined by a removable sacrificial material. A method of forming the fuel cell assembly includes the steps of providing the interconnect structure having at least one flow channel, depositing the sacrificial material into the flow channel, depositing an electrode or an electrode/electrolyte material upon the interconnect structure and the sacrificial material, and processing the fuel cell so as to remove the sacrificial material.

18 Claims, 6 Drawing Sheets

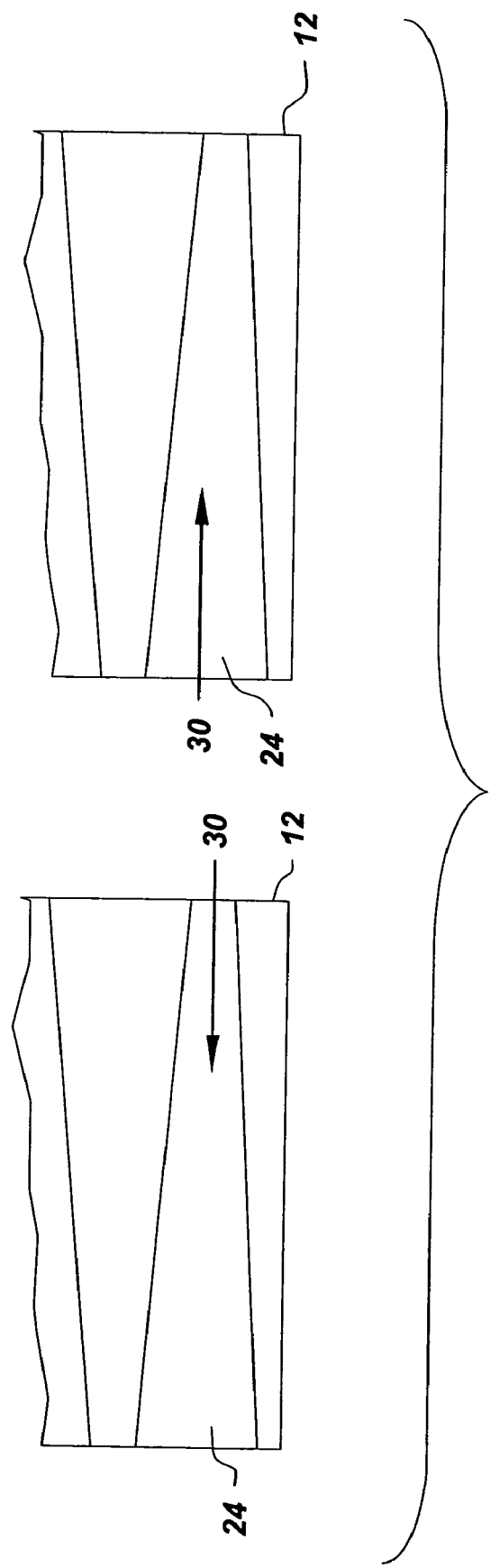

US 7,575,821 B2

INTERCONNECT SUPPORTED FUEL CELL ASSEMBLY AND PREFORM

BACKGROUND OF INVENTION

This invention relates generally to fuel cells and more specifically to interconnect supported fuel cell assemblies, preforms and methods of fabrication.

Fuel cells, for example Solid Oxide Fuel Cells (SOFC), are electrochemical devices that have many potential applications including large-scale power generation, distributed power and automobiles. One of the key challenges is to develop cost effective processes to manufacture electrode and electrolyte materials, especially with large surface areas.

In the past, anode, cathode or electrolyte supported approaches were used for cell fabrication. It is desirable for each of these components to be thin but the anode, cathode and electrolyte are all typically made of fragile based ceramics. Necessarily, in conventional fuel cells, in order to provide support for cell fabrication, at least one of the components must be thick.

Accordingly, there is a need for an improved support approach for fuel cell fabrication.

SUMMARY OF INVENTION

A fuel cell assembly includes at least one fuel cell including at least two electrodes separated by an electrolyte, as well as a means for distributing reagent to the electrodes, typically via an interconnect structure. The interconnect structure includes at least one flow channel initially defined by a removable sacrificial material. A method of forming the fuel cell assembly includes the steps of providing the interconnect structure having the at least one flow channel, depositing a sacrificial material into the flow channel, depositing electrode/electrolyte materials upon the interconnect structure and the sacrificial material, and processing the fuel cell so as to remove the sacrificial material.

DRAWINGS

These and other features, aspects, and advantages of the present invention will become better understood when the following detailed description is read with reference to the accompanying drawings in which like characters represent like parts throughout the drawings, wherein:

FIG. 9 is a cross-sectional view of an alternate embodiment of an interconnect portion with a fluid flow channel with a convergent or a divergent cross-section.

DETAILED DESCRIPTION

Figure 1:
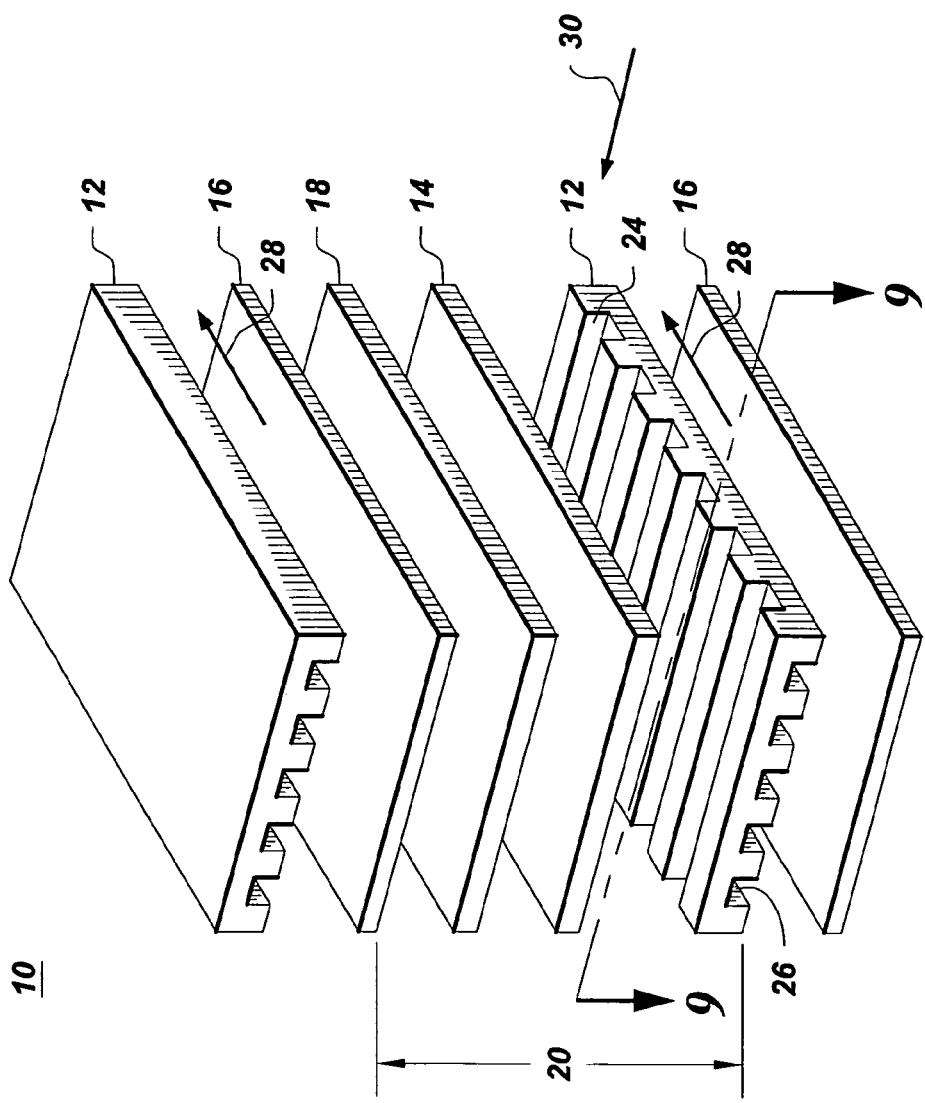
FIG. 1 is an exploded perspective view of an exemplary Solid Exide Fuel Cell (SOFC)

A fuel cell, for example a Solid Oxide Fuel Cell (SOFC), is an energy conversion device that produces electricity by electrochemically combining a fuel and an oxidant across an ionic conducting layer. An exemplary planar fuel cell 10 comprises an interconnect portion 12, a pair of electrodes, a cathode 14 and an anode 16, separated by an electrolyte 18, as shown in FIG. 1. Each fuel cell 10 is a repeat cell unit 20 capable of being stacked together in series, in parallel or both to form a fuel cell stack system or architecture capable of producing a summed output.

Interconnect portion 12 defines a plurality of airflow channels 24 in intimate contact with the cathode 14 and a plurality of fuel flow channels 26 in intimate contact with the anode 16 of an adjacent cell repeat unit 20, or vice versa. During operation, a fuel flow 28 is supplied to fuel flow channels 26 and an airflow 30, typically heated air, is supplied to the airflow channels 24.

Figure 2:
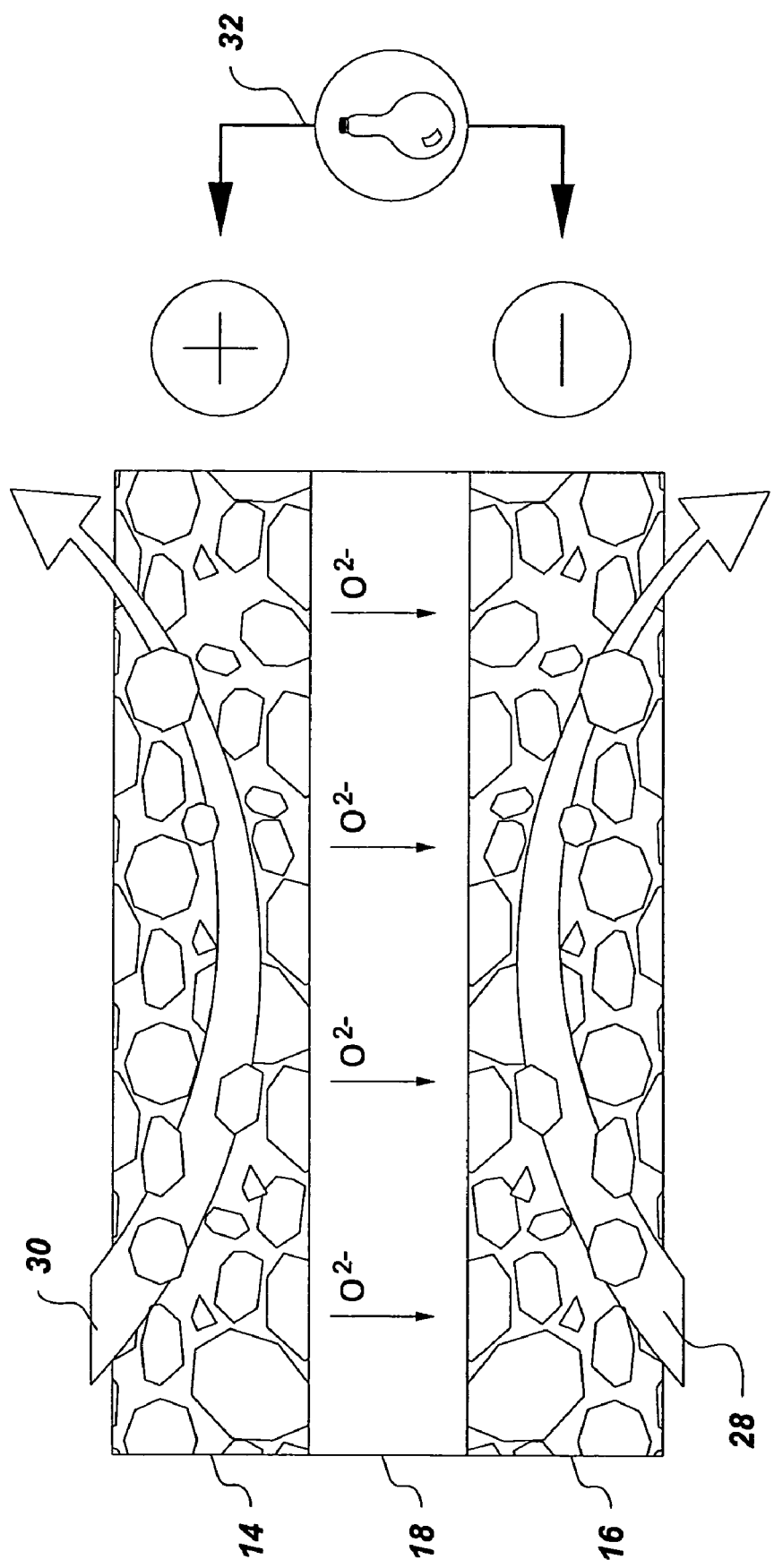
FIG. 2 is a cross-sectional view of cathode and anode of the SOFC of FIG. 1.

As shown in FIG. 2, the fuel flow 28, for example natural gas, is fed to the anode 16 and undergoes an oxidation reaction and releases electrons to an external electric circuit 32. The airflow 30 is fed to the cathode 14 and accepts electrons from the external electric circuit 32 and undergoes a reduction reaction. The electrolyte 18 conducts ions between the anode 16 and the cathode 14. The electron flow produces direct current electricity and the process produces certain exhaust gases and heat.

Figure 3:
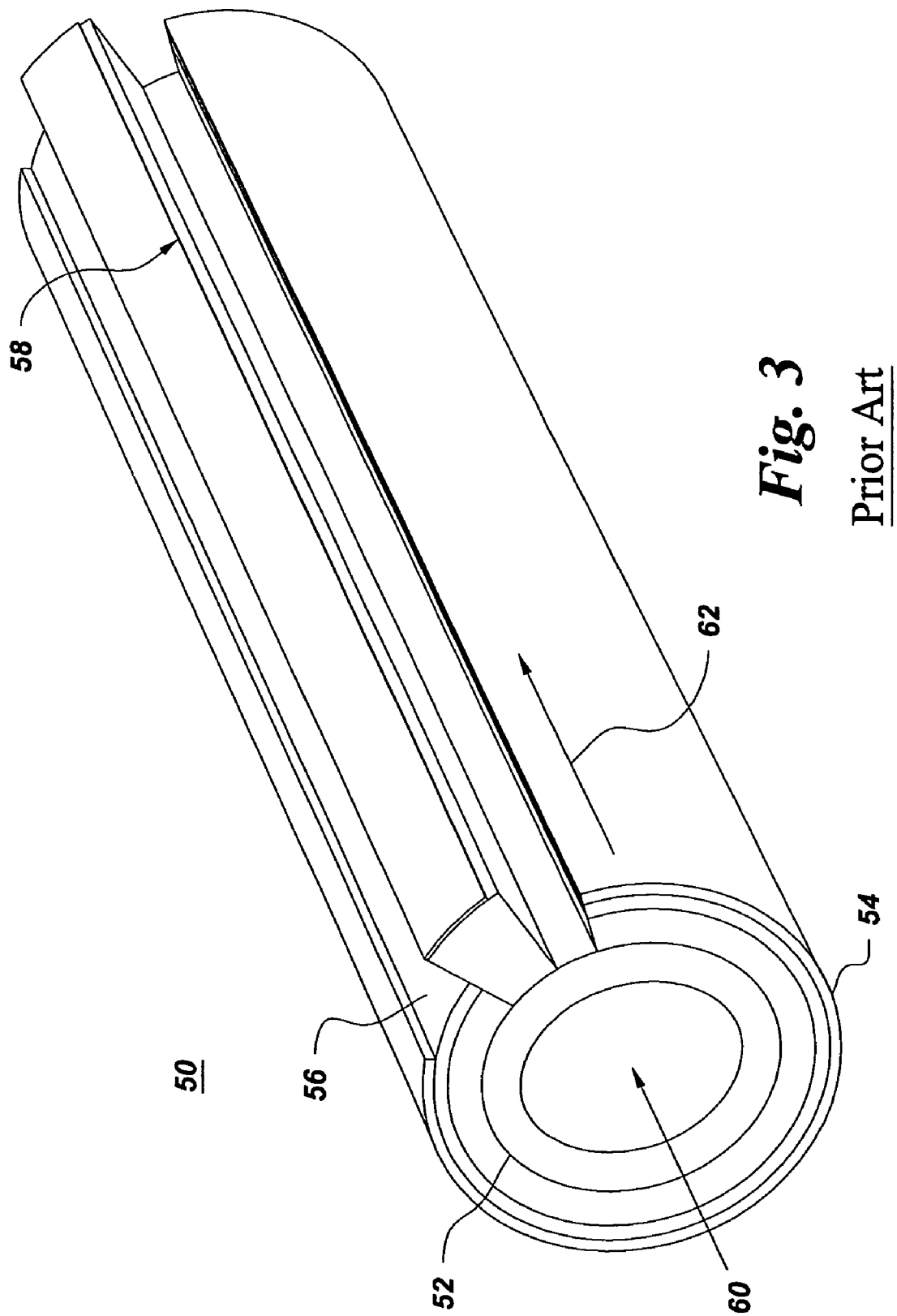
FIG. 3 is a perspective view of an exemplary tubular fuel cell.
Figure 4:
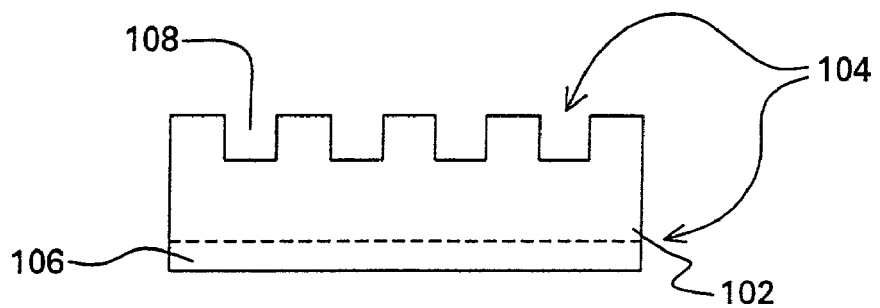
FIG. 4 is a cross-sectional view of an interconnect portion of an interconnect supported planar fuel cell in accordance with an embodiment of the invention.

An exemplary tubular fuel cell 50 comprises an inner cathode tube 52, an outer anode tube 54, and an electrolyte layer 56 disposed therebetween, as shown in FIG. 3. An interconnect 58 is disposed on the cathode tube 54 and is in intimate contact with the electrolyte layer 56. Each tubular fuel cell 50 is a repeat cell unit capable of being bundled together in series, in parallel or both to form a fuel cell bundle or architecture capable of producing a summed output.

During operation, an airflow 60 is supplied within inner cathode tube 52 and a fuel flow 62 is supplied upon the outer surface of outer anode tube 52. The heated airflow 60 and the fuel flow 62 electrochemically react in the same manner as discussed above.

The number of individual cells in a stack or bundle determines the voltage of the fuel cell system, and amperage rating is determined, in large part, by the surface area of the electrodes. One of the key challenges is to develop cost effective processes to manufacture anode, cathode and electrolyte materials, each having a relatively thin cross-sections, to reduce resistive losses, with large surface areas to minimize fabrication and assembly costs.

In accordance with one embodiment of the instant invention, an interconnect supported planar fuel cell 100 is shown in FIGS. 4-7.

An interconnect portion 102 defines a plurality of fluid flow channels 104 disposed within the body of the interconnect portion 102. A portion of the fluid flow channels 104 are airflow channels 106 and a portion of the fluid flow channels 104 are fuel flow channels 108. The primary function of the interconnect portion 102 is to electrically connect the anode of one repeatable cell unit to the cathode of an adjacent cell unit. In addition, the interconnect portion 102 should provide uniform current distribution, should be impermeable to gases, stable in both reducing and oxidizing environments and adequately conductive to support electron flow at a variety of temperatures. The interconnect portion 102 can be made of a number of materials having these properties, including but not limited to, thin-formed metal, stainless steel, cobaltite, ceramic, $LaCrO_3$, $CoCr_2O_4$, Inconel 600, Inconel 601, Hastelloy X, and Hastelloy-230 and combinations thereof. The interconnect portion 102 typically has a thickness in the range between about 0.1 mm to about 5 mm and preferably between about 0.25 mm to about 0.5 mm.

Figure 5:
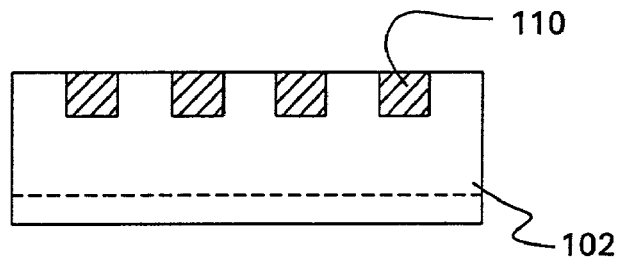
FIG. 5 is a cross-sectional view of the interconnect supported planar fuel cell after a sacrificial material is disposed within flow channels of the interconnect portion.

In order to support cell fabrication, the interconnect portion 12 must provide an appropriate surface for depositing, coating or otherwise disposing (hereinafter deposition) electrode or electrolyte materials. Accordingly, at least a portion of the fluid flow channels 104 are filled with a sacrificial material 110 to provide a relatively uniform support surface on interconnect portion 102, suitable for deposition, as shown in FIG. 5. The sacrificial material 110 fills the fluid flow channels 104 and provides a temporary substrate for deposition of electrode or electrolyte materials. The use of the interconnect portion 102 as a support structure for cell fabrication provides a low-cost, large-area fabrication mechanism allowing for layer-by-layer deposition upon the interconnect portion 102. Interconnect portion 102 can have a fluid flow channel 104 with a uniform cross-section or a convergent or divergent cross-section, as shown in FIG. 9, a tubular, a rectangular or other metal-formable geometry.

The sacrificial material 110 can be made of any material that can provide a temporary substrate for deposition of the electrode or electrolyte materials and be removed with appropriate processing after the deposition process is completed. The sacrificial material 110 can be, for example, a polymer, a salt, a polymer foam, soluble materials, polyurethane, paraffin, low density foamed polymers or the like. Processes for removable of the sacrificial material 110 can include heating, chemical etching, ablation, dissolution or any appropriate removal process for the corresponding sacrificial material 110.

Figure 6:
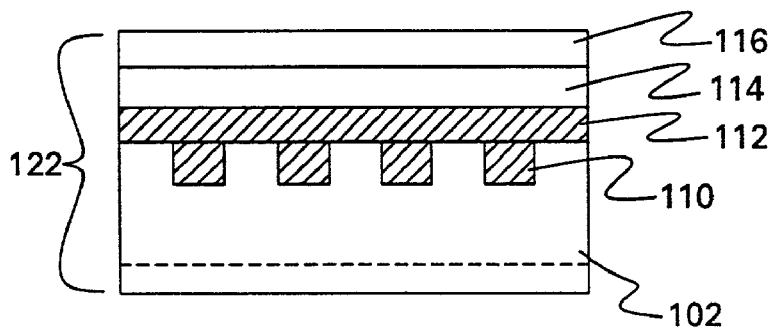
FIG. 6 is a cross-sectional view of the interconnect supported planar fuel cell after an anode layer is disposed upon the interconnect portion and sacrificial material, an electrolyte material is disposed on the anode layer, and a cathode layer is disposed on the electrolyte material.

An anode layer 112 is disposed upon the interconnect portion 102 and the sacrificial material 110 substrate, typically via deposition or by placement of an anode sheet or the like, as shown in FIG. 6. It is recognized that either electrode material (anode or cathode) or the electrolyte material or a combination thereof could be initially deposited or otherwise provided upon the interconnect portion 102 and sacrificial material 110 substrate preform. The use of the anode layer 112 as the first layer is for purpose of example only.

The main purpose of anode layer 112 is to provide reaction sites for the electrochemical oxidation of a fuel introduced into the fuel cell. In addition, the anode material should be stable in the fuel-reducing environment, have adequate electronic conductivity, surface area and catalytic activity for the fuel gas reaction at the fuel cell operating conditions and have sufficient porosity to allow gas transport to the reaction sites. The anode can be made of a number of materials having these properties, including but not limited to, metal, nickel (Ni), Ni alloy, nickel (Ni), Ni alloy, silver (Ag), copper (Cu), noble metals, gold, platinum, palladium, rhodium and iridium, cobalt, ruthenium, Ni-yttria stabilized zirconia (YSZ) cermet, Cu—YSZ cermet, Ni-ceria, cermet, ceramics or combinations thereof.

An electrolyte layer 114 is disposed upon the anode layer 112, typically via deposition, as shown in FIG. 6. The main purpose of electrolyte layer 114 is to conduct ions between the anode layer 114 and a cathode layer. The electrolyte layer 114 carries ions produced at one electrode to the other electrode to balance the charge from the electron flow and complete the electrical circuit in the fuel cell 100. Additionally, the electrolyte 114 separates the fuel from the oxidant in the fuel cell 100. Accordingly, the electrolyte 114 must be stable in both the reducing and oxidizing environments, impermeable to the reacting gases and adequately conductive at the operating conditions. Typically, the electrolyte layer 114 is substantially electronically insulating. The electrolyte layer 114 can be made of a number of materials having these properties, including but not limited to, $ZrO_2$, YSZ, doped ceria, $CeO_2$, Bismuth sesquioxide, pyrochlore oxides, doped zirconates, perovskite oxide materials and combinations thereof.

Electrolyte layer 114 typically has a thickness such that electrolyte is substantially gas impermeable. The thickness of electrolyte layer 114 is typically less than 50 μm, preferably in the range between about 0.1 μm thick to about 10 μm, and most preferably in the range between about 1 μm thick to about 5 μm thick.

A cathode layer 116 is disposed upon the electrolyte 114 to complete the repeatable cell unit 118, as shown in FIG. 6. The main purpose of cathode layer 116 is to provide reaction sites for the electrochemical reduction of the oxidant. Accordingly, the cathode layer 116 must be stable in the oxidizing environment, have sufficient electronic conductivity, surface area and catalytic activity for the oxidant gas reaction at the fuel cell operating conditions and have sufficient porosity to allow gas transport to the reaction sites. The cathode layer 116 can be made of a number of materials having these properties, including but not limited to, an electrically conductive oxide, perovskite, doped $LaMnO_3$, Sr-doped $LaMnO_4$ (SLM), tin doped Indium Oxide ($In_2O_3$), Strontium-doped $PrMnO_3$, $LaFeO_3$—$LaCoO_3RuO_2$-YSZ, La Cobaltite, and combinations thereof.

Electrodes 112, 116 typically have a surface area sufficient to support electrochemical reaction, for example in the range between about 1 m2/g to about 1000 m2/g. Electrodes 112, 114 are typically thermally stable between about 80C to about 1000C and preferably between about 300C to about 1000C.

Figure 7:
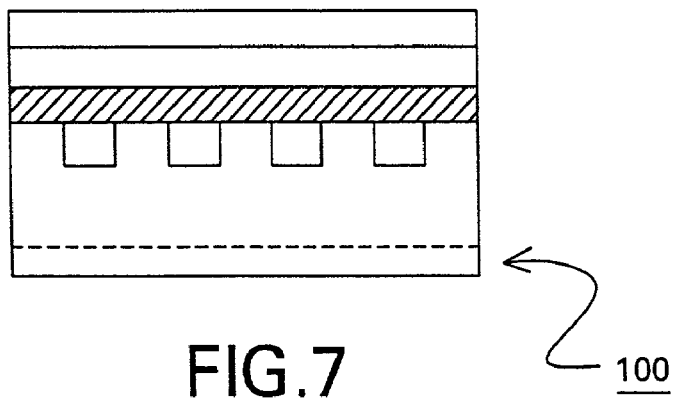
FIG. 7 is a cross-sectional view of the interconnect supported planar fuel cell after the sacrificial material is removed and the fluid flow channels are opened.

The fuel cell 100 is processed to remove the sacrificial material 110 from the fluid flow channels 104 and the fluid flow channels 104 are opened, as shown in FIG. 7.

Fuel cell 100 can be any type of fuel cell that requires flow channels including but not limited to solid oxide fuel cells, proton exchange membrane or solid polymer fuel cells, molten carbonate fuel cells, phosphoric acid fuel cells, alkaline fuel cells, direct methanol fuel cells, regenerative fuel cells, zinc air fuel cells, or protonic ceramic fuel cells.

Figure 8:
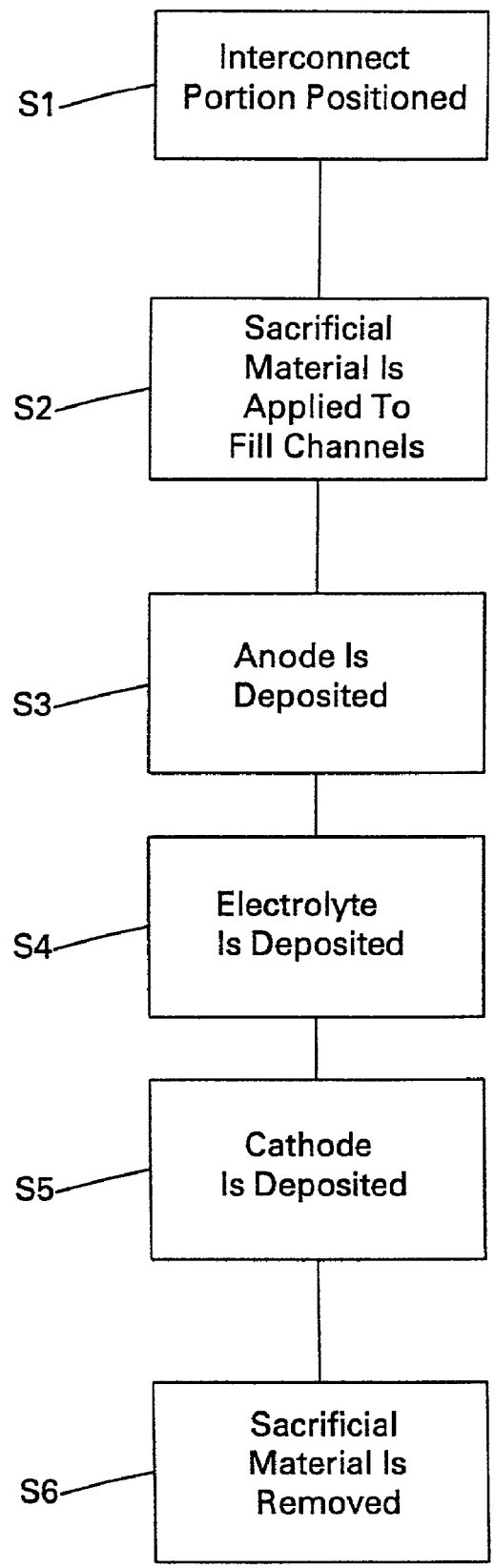
FIG. 8 is a flow chart that depicts an exemplary process for fabrication of the interconnect supported planar fuel cell of the invention.

FIG. 8 is a flow chart that depicts an exemplary process for fabrication of an interconnect supported fuel cell such as planar fuel cell 100.

First, the interconnect portion is positioned for deposition (S1). The interconnect portion can be made, for example, from stamped sheet metal such as stainless steel or the like. Next, a sacrificial material is deposited within the fluid flow channels of the interconnect portion to provide a substrate for layer-by-layer deposition of the electrodes and the electrolyte (S2). The sacrificial material, for example a foam, is sprayed, poured, or otherwise applied so as to fill the fluid flow channels. Necessary intermediate steps are taken so as to prevent the sacrificial material from interfering with subsequent deposition of the electrode or electrolyte materials. One example of an intermediate steps would be to dispose a substantially flat sheet upon the interconnect so as to cover the fluid flow channels. The sacrificial material is then introduced via the fluid flow channel openings on either side of the interconnect support and the channels are filled until the foam completely fills the channels and contacts the top sheet. The sheet is then removed from the interconnect portion and the deposition of the next layer can be completed. Another example of an intermediate step is introding the sacrificial material into the fluid flow channels until the channels are completely filled or slightly overflowing. Any residue or overflow of the sacrificial material is then scraped off of the interconnect so as to planarize the substrate and provide a flat, clean surface for deposition.

Next, one of the electrode materials, in this case the anode material, is deposited upon the interconnect-sacrificial material substrate (S3). Next, the electrolyte material is deposited upon the anode materials (S4). Next, the cathode material is deposited upon the electrolyte material (S5). Finally, the interconnect supported fuel cell is processed to remove the sacrificial material (S6).

Many processes can be utilized to deposit or otherwise dispose the electrode or electrolyte materials upon the substrate, including but not limited to, sputtering, sol-gel, tape calendaring, jet vapor deposition, expanding thermal plasma deposition (discussed in greater detail in co-pending, commonly assigned application, entitled "Method for Manufacturing Fuel Cells and Articles Made Therewith," which application is hereby incorporated by reference) electrophoretic deposition, plasma enhanced chemical vapor deposition, CVD, PVD, or the like.

While the invention has been illustrated and described, it is not intended to be limited to the details shown, since various modifications and substitutions can be made without departing in any way from the spirit of the present invention. As such, further modifications and equivalents of the invention herein disclosed can occur to persons skilled in the art using no more than routine experimentation, and all such modifications and equivalents are believed to be within the spirit and scope of the invention as defined by the following claims.

What is claimed is:

1. An interconnect-supported fuel cell comprising:
   an interconnect preform comprising an interconnect support structure having a top surface and at least one flow channel disposed within said interconnect support structure, and a removable sacrificial material disposed within said at least one flow channel, wherein said sacrificial material substantially fills said at least one flow channel and combines with said top surface of said interconnect support structure to provide a temporary, substantially planar support surface suitable for deposition thereupon; and
   a layer of electrode material disposed on said temporary, substantially planar support surface by using a deposition process.

2. A fuel cell in accordance with claim 1, wherein said sacrificial material is removed after the deposition process is completed.

3. A fuel cell in accordance with claim 1, wherein said sacrificial material is removed by heating, chemical etching, ablation, or dissolution.

4. A fuel cell in accordance with claim 1, wherein said deposition process comprises one of sputtering, sol-gel, tape calendaring, jet vapor deposition, expanding thermal plasma deposition, electrophoretic deposition, plasma enhanced chemical vapor deposition, chemical vapor deposition and plasma vapor deposition.

5. A fuel cell in accordance with claim 1, wherein said sacrificial material comprises a foam material.

6. A fuel cell in accordance with claim 1, wherein said layer of electrode material is selected from the group consisting of metal, Ni, Ni Alloy, Ag, Cu, Noble metals, Cobalt, Ruthenium, Ni—YSZ cermet, Cu—YSZ cermet, Ni-Ceria, cermet, ceramics or combinations thereof.

7. A fuel cell in accordance with claim 1, wherein said layer of electrode material is doped $LaMnO_3$, Sr-doped $LaMnO_4$ (SLM), tin doped Indium Oxide ($In_2O_3$), perovisite, Strontium-doped $PrMnO_3$, $LaFeO_3$—$LaCoO_3$ $RuO_2$-YSZ, La Cobaltite, and combinations thereof.

8. A fuel cell in accordance with claim 1, wherein said layer of electrolyte material is selected from the group consisting of $ZrO_2$, YSZ, doped ceria, $CeO_2$, Bismuth sesquioxide, pyrochlore oxides, doped zirconates, perovskite oxide materials and combinations thereof.

9. A fuel cell in accordance with claim 1, wherein said interconnect support structure comprises one of a thin-formed metal, stainless steel, cobaltite, ceramic, $LaCrO_3$, $CoCr_2O_4$, Inconel 600, Inconel 601, Hastelloy X, and HA-230 and combinations thereof.

10. An interconnect-supported solid oxide fuel cell comprising:
    an interconnect portion comprising an interconnect preform formed by an interconnect support structure having at least one flow channel disposed therein, and a removable sacrificial material disposed within said at least one flow channel, wherein said sacrificial material substantially fills said at least one flow channel to provide a temporary substrate suitable for deposition thereupon; and
    a layer of electrode material disposed on said temporary substrate by using a deposition process.

11. A fuel cell in accordance with claim 10, wherein said sacrificial material is removed after the deposition process is completed.

12. A fuel cell in accordance with claim 10, wherein said sacrificial material is removed by heating, chemical etching, ablation, or dissolution.

13. A fuel cell in accordance with claim 10, wherein said deposition process comprises one of sputtering, sol-gel, tape calendaring, jet vapor deposition, expanding thermal plasma deposition, electrophoretic deposition, plasma enhanced chemical vapor deposition, chemical vapor deposition and plasma vapor deposition.

14. A fuel cell in accordance with claim 10, wherein said sacrificial material comprises a foam material.

15. A fuel cell in accordance with claim 10, wherein said layer of electrode material is selected from the group consisting of metal, Ni, Ni Alloy, Ag, Cu, Noble metals, Cobalt, Ruthenium, Ni—YSZ cermet, Cu—YSZ cermet, Ni-Ceria, cermet, ceramics or combinations thereof.

16. A fuel cell in accordance with claim 10, wherein said layer of electrode material is doped $LaMnO_3$, Sr-doped $LaMnO_4$ (SLM), tin doped Indium Oxide ($In_2O_3$), perovisite, Strontium-doped $PrMnO_3$, $LaFeO_3$—$LaCoO_3$ $RuO_2$-YSZ, La Cobaltite, and combinations thereof.

17. A fuel cell in accordance with claim 10, wherein said layer of electrolyte material is selected from the group consisting of $ZrO_2$, YSZ, doped ceria, $CeO_2$, Bismuth sesquioxide, pyrochlore oxides, doped zirconates, perovskite oxide materials and combinations thereof.

18. A fuel cell in accordance with claim 10, wherein said interconnect support structure comprises one of a thin-formed metal, stainless steel, cobaltite, ceramic, $LaCrO_3$, $CoCr_2O_4$, Inconel 600, Inconel 601, Hastelloy X, and HA-230 and combinations thereof.

* * * * *